United States Patent Office 3,346,619
Patented Oct. 10, 1967

3,346,619
PROCESS FOR PREPARING AN $NF_2$-CONTAINING NITRATE
William E. Tyler III, New Providence, and John R. Lovett, Edison, N.J., assignors to Esso Research and Engineering Company, a corporation of Delaware
No Drawing. Filed Aug. 22, 1962, Ser. No. 219,370
5 Claims. (Cl. 260—467)

This invention relates to a process for synthesizing high-energy oxidizers which are organic nitrates containing difluoramino ($NF_2$) groups by reacting an organic isocyanate containing $NF_2$ groups with nitrogen tetroxide, $N_2O_4$. More particularly, it is concerned with the preparation of extremely energetic compounds useful in rocket propellants as sources of fluorine and oxygen, including compounds which have $NF_2$ and $ONO_2$ groups attached to the same carbon atom of such compounds.

In the classical method of preparing a nitrate ester, such as ethyl nitrate, the alcohol, e.g., ethyl alcohol, is reacted with the nitric acid. This direct action of $HNO_3$ has been used to prepare nitrate esters containing $NF_2$ groups when $NF_2$ and nitrato ($ONO_2$) groups are on different carbon atoms. Unfortunately, esterification of an alcohol having an $NF_2$ group linked to carbon of a C—OH group by nitric acid had been found difficult due to occurrence of severe decomposition. Hence, a more reliable method was sought.

Now, in accordance with the present invention, organic nitrates, compounds having $NF_2$ groups, even with an $NF_2$ group linked to carbon in a C—$ONO_2$ group, are prepared more reliably by reacting an $NF_2$-containing isocyanate with $N_2O_4$.

Examples of $NF_2$-containing isocyanates considered useful as reactants for preparing corresponding $NF_2$-containing nitrates by reaction with $N_2O_4$ are represented, in general, by the formula:

$$R(NF_2)_a(NCO)_b$$

wherein R represents the organic compound in which ($NF_2$) and (NCO) groups are substituents, said compound being alkanes of 2 to 6 carbon atoms, cyclohexane, and tetrahydrofuran; the subscript $a$ signifying at least 2 to the number of carbon atoms in the R compound; and subscript $b$ signifying 1 to 2 of the isocyanato (NCO) substituents.

Typical specific examples of the isocyanates coming within the general formula are: 1,2-bis-(difluoramino) ethyl isocyanate having the formula $$CH_2(NF_2)CH(NF_2)(NCO)$$

1,2-bis-(difluoramino) ethylene diisocyanate having the formula $(NCO)CH(NF_2)CH(NF_2)(NCO)$ which may also be termed 1,2-bis-($NF_2$) 1,2-diisocyanato ethane; 2,3-bis-($NF_2$) 1,4-diisocyanato butane having the formula $(NCO)CH_2CH(NF_2\cdot)CH(NF_2)CH_2(NCO)$; 1,2,3,4-tetrakis-($NF_2$) 1,4-diisocyanato butane having the formula $$(NCO)CH(NF_2)CH(NF_2)CH(NF_2)CH(NF_2)(NCO)$$

Other compounds coming within the general formula are difluoramino-containing -propane, -butane, -hexane, -cyclohexane and -tetrahydrofuran isocyanates. In general, the difluoramino organic isocyanates which are formed have been prepared by reaction of the unsaturated isocyanates with $N_2F_4$ in an inert diluent under subatmospheric pressure or superatmospheric pressure at moderate temperatures of about 100° to 150° C. In using the $NF_2$-containing isocyanates as starting reactants for conversion of the isocyanato groups to nitrate groups, tests showed that the desired reaction could be obtained under subatmospheric to superatmospheric pressures at temperatures in the range of about —10° C. to 50° C., and preferably about 0° C. to room temperature (20° to 25° C.) at a suitable reaction rate. The reaction is represented by the following equation:

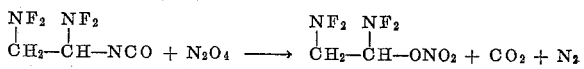

An excess of the $N_2O_4$ may be used, and it is desirable to use a suitable inert liquid organic diluent which remains liquid under the reaction conditions and which can be conveniently separated from the desired nitrate product. The most suitable diluents have been found to be polyhalogenated hydrocarbon liquids, e.g., the chloro and fluoro-substituted methane and ethane compounds which boil in the range of 0° to 50° C., such as trichloro monofluoro methane, $CCl_3F$, having a boiling point of about 25° C. Methylene chloride, $CH_2Cl_2$, having a boiling point of 40.8° C., was used to obtain the desired nitrate product, but was found to be not as suitable as the fluorine-containing homologs of lower boiling point in separating the bis-($NF_2$) ethyl nitrate from the solvent.

The following examples are meant to illustrate the preferred modes of preparing the desired nitrate esters.

Example 1

6.4 g. of 1,2-bis-(difluoramino) ethyl isocyanate in 50 ml. of purified $CCl_3F$ was added to 2.5 ml. of dried $N_2O_4$ in 100 ml. of $CCl_3F$ at 0° C. After stirring for 4 days at 0° to 2° C., the solvent was removed in a warm water bath. The residue was first distilled, then further purified on a preparative gas chromatography column. The product was a pale blue liquid of which analyses are consistent with the composition of 1,2-bis-(difluoramino) ethyl nitrate, $CH_2(NF_2)CH(NF_2)ONO_2$.

The infrared (IR) and the fine line nuclear magnetic resonance (NMR) spectra are consistent with the structure of 1,2-bis-(difluoramino) ethyl nitrate.

The offgas from the reaction mixture was collected over a heavy hydrocarbon oil and was found by mass spectometry to contain $N_2$ and $CO_2$ as reaction products in the recovery of the nitrate ester. It is desirable to be able to boil off the inert polyhalogen diluent and then to distill the residue under vacuum, e.g., under subatmospheric pressure as low as 0.01 mm. Hg abs.

*Analysis.*—Calculated: C, 12.4%; N, 21.8%; F, 39.4%. Found: C, 13.3%; N, 20.9%; F, 38.4%.

Example 2

To form 1,2-bis-(difluoramino) 1,2-dinitrato ethane, 1,2-bis-(difluoramino) ethylene diisocyanate is reacted with $CH_2Cl_2$ with $N_2O_4$ at temperatures ranging from 0° to about 25° C. It was found that excess $N_2O_4$ had to be used to make the reaction occur and at the same time, a limited excess of $N_2O_4$ with dilution by the inert diluent was necessary to avoid extensive degradation. With the reaction running smoothly, $CO_2$ and $N_2$ are evolved to obtain a product having the following structural formula:

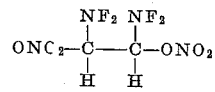

The chemical analyses for this product shows about 10% C, 22% N, 29% F. The desired product when isolated is a heavy colorless liquid.

The other difluoramino-substituted organic nitrates are similarly made from the $NF_2$-containing isocyanates of the alkanes, cyclohexane and tetrahydrofuran. The resulting difluoramino nitrate esters are liquids useful both as oxidizers and plasticizers with nitrocellulose binders or polymeric binders having nitro, nitroxy and/or $NF_2$ groups attached to carbon atoms in the polymeric molecule chains. The preferred compounds have a maximum proportion of $NF_2$ and $ONO_2$ groups with respect to the carbon atoms.

A solid rocket propellant composite containing 50 wt. percent 1,2-bis-($NF_2$) ethyl nitrate, 29 wt. percent hexanitroethane, 1 wt. percent boron powder and 20 wt. percent polybutadiene-$N_2F_4$ adduct having the composition $[C_4H_6(NF_2)_{1.3}]$ has been determined to have a specific impulse of 292 seconds. Similar high Isp propellants can be obtained with the $NF_2$-containing nitrate esters, other oxidizers, powdered metal fuels and high-energy binders suitable for solid propellants.

The invention described is claimed as follows:

1. The method for preparing an $NF_2$-containing nitrate, which comprises reacting $N_2O_4$ with an isocyanate having the formula:

$$R(NF_2)_a(NCO)_b$$

wherein R represents an organic compound in which $NF_2$ and NCO groups are substituents, said compound being selected from the group consisting of alkanes of 2 to 6 carbon atoms, cyclohexane and tetrahydrofuran, and the subscript $a$ signifying at least 2 to the total number of carbon atoms in the R compound, and the subscript $b$ signifying 1 to 2 of the isocyanato (NCO) substituents, and recovering a resulting compound corresponding to the isocyanate in which the NCO substituent groups are converted to $ONO_2$ groups.

2. The method as described in claim 1 in which the $N_2O_4$ is contained in an inert diluent.

3. The method as described in claim 1 in which the $N_2O_4$ is contained in a liquid halohydrocarbon diluent and in which the reaction is made to take place at a temperature in the range of about 0° to 50° C.

4. The method of forming 1,2-bis-(difluoramino) ethyl nitrate, which comprises reacting 1,2-bis-(difluoramino) ethyl isocyanate in liquid $CCl_3F$, with at least one mole of $N_2O_4$ per mole of said isocyanate, at a reaction temperature in the range of about 0° to 25° C. until 1,2-bis-(difluoramino) ethyl nitrate is formed, stripping solvent from the resulting product and recovering from said product a resulting distillate of 1,2-bis-(difluoramino) ethyl nitrate.

5. The method of preparing a difluoramino-substituted alkane dinitrate, which comprises reacting a difluoramino alkane diisocyanate with $N_2O_4$ in an inert polyhalogenated hydrocarbon liquid that boils in the range of 0° to 50° C. having sufficient $N_2O_4$ to obtain evolution of $CO_2$ and $N_2$ gas until isocyanato groups in the isocyanate are converted to nitrate groups, and recovering the resulting difluoramino alkane nitrate ester.

No references cited.

CARL D. QUARFORTH, *Primary Examiner.*

LEON D. ROSDOL, *Examiner.*

J. W. WHISLER, L. A. SEBASTIAN,
*Assistant Examiners.*